(12) United States Patent
Choi et al.

(10) Patent No.: US 8,344,999 B2
(45) Date of Patent: Jan. 1, 2013

(54) POWERLESS ELECTRONIC NOTEPAD AND POWERLESS WIRELESS TRANSMISSION SYSTEM USING THE SAME

(75) Inventors: Byoung Gun Choi, Daegu (KR); Kyung Soo Kim, Daejeon (KR); Jung Bum Kim, Daejeon (KR); In Gi Lim, Daejeon (KR); Chang Hee Hyoung, Daejeon (KR); Hyung Il Park, Daejeon (KR); Sung Eun Kim, Seoul (KR); Tae Wook Kang, Daejeon (KR); Hey Jin Myoung, Daejeon (KR); Kyung Hwan Park, Daejeon (KR); Seok Bong Hyun, Daejeon (KR); Jung Hwan Hwang, Daejeon (KR); Tae Young Kang, Seoul (KR); Sung Weon Kang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 605 days.

(21) Appl. No.: 12/507,664

(22) Filed: Jul. 22, 2009

(65) Prior Publication Data

US 2010/0147601 A1     Jun. 17, 2010

(30) Foreign Application Priority Data

Dec. 15, 2008 (KR) ........................ 10-2008-0127180

(51) Int. Cl.
G09G 5/08 (2006.01)
(52) U.S. Cl. ........ 345/156; 345/169; 345/157; 345/173; 178/18.01; 463/36; 463/37; 340/12.51; 340/13.26

(58) Field of Classification Search .......... 345/156–162, 345/168–173; 178/18.01; 340/10, 10.1, 340/12.51, 13.26; 463/36, 37
See application file for complete search history.

(56) References Cited

U.S. PATENT DOCUMENTS

| | | | | |
|---|---|---|---|---|
| 4,633,123 A | * | 12/1986 | Radice | 310/339 |
| 4,634,917 A | * | 1/1987 | Dvorsky et al. | 310/328 |
| 4,975,616 A | * | 12/1990 | Park | 310/339 |
| 5,760,530 A | * | 6/1998 | Kolesar | 310/339 |
| 2003/0067448 A1 | | 4/2003 | Park | |
| 2003/0158819 A1 | * | 8/2003 | Scott | 705/65 |
| 2006/0087496 A1 | | 4/2006 | Maciejewski | |
| 2007/0139385 A1 | * | 6/2007 | Inokuchi | 345/173 |
| 2008/0062013 A1 | * | 3/2008 | Face et al. | 341/20 |
| 2008/0082025 A1 | * | 4/2008 | Hughes et al. | 600/595 |

FOREIGN PATENT DOCUMENTS

| | | |
|---|---|---|
| JP | 2003069433 A * | 3/2003 |
| KR | 1020020057683 A | 7/2002 |
| KR | 1020050032533 A | 4/2005 |
| KR | 1020050096558 A | 10/2005 |
| KR | 100835181 B1 | 5/2008 |
| WO | WO 2008/133411 A1 | 11/2008 |

\* cited by examiner

Primary Examiner — Lun-Yi Lao
Assistant Examiner — Priyank Shah

(57) ABSTRACT

The present invention relates to a powerless electronic notepad and a powerless wireless transmission system using the same, and more particularly, to a powerless electronic notepad that stores data recorded on an electronic notepad using piezoelectric elements and transmits the stored data using a passive RFID tag without the use of a power source, and a powerless wireless transmission system using the same.

6 Claims, 3 Drawing Sheets

POWERLESS ELECTRONIC NOTEPAD AND POWERLESS WIRELESS TRANSMISSION SYSTEM USING THE SAME

CROSS-REFERENCE TO RELATED APPLICATIONS

This application claims the priority of Korean Patent Application No. 2008-127180 filed on Dec. 15, 2008, in the Korean Intellectual Property Office, the disclosure of which is incorporated herein by reference.

BACKGROUND OF THE INVENTION

1. Field of the Invention

The present invention relates to a powerless electronic notepad and a powerless wireless transmission system using the same, and more particularly, to a powerless electronic notepad that stores data recorded on an electronic notepad using piezoelectric elements and transmits the stored data using a passive RFID tag without the use of a power source, and a powerless wireless transmission system using the same.

2. Description of the Related Art

In the related art, electronic notepads can operate only when they are connected to power sources. Therefore, when electronic notepads connected to power cables are used in the related art, the length of the power cables limits the locations where the electronic notepads can be used. When batteries are installed in electronic notepads, it is inconvenient to constantly charge them.

In order to wirelessly transmit data stored in a memory of an electronic notepad to an external apparatus, such as a personal computer (PC) or a laptop computer, a near-field wireless transmission and reception apparatus using a protocol, such as Bluetooth or Zigbee, may be used. Here, since power sources are also required for data transmission, the above-described problems may also occur.

SUMMARY OF THE INVENTION

An aspect of the present invention provides a powerless electronic notepad that stores data recorded on an electronic notepad using piezoelectric elements and transmits the stored data using a passive RFID tag without the use of a power source, and a powerless wireless transmission system using the same.

According to an aspect of the present invention, there is provided a powerless electronic notepad including: a pad having therein a plurality of piezoelectric elements arranged in a lattice pattern; and an RFID tag having a memory storing data and an antenna performing RFID communications, and a piezoelectric element at a point against which a pen is pressed generates voltage among the plurality of piezoelectric elements to thereby supply power to the memory, and the coordinates of the point against which the pen is pressed are stored in the memory.

The RFID tag may include a passive RFID tag.

The antenna may transmit data, stored in the memory, to an external apparatus having an RFID reader therein without the use of a power source.

According to another aspect of the present invention, there is provided a powerless wireless transmission system including: a powerless electronic notepad including a pad having a plurality of piezoelectric elements arranged in a lattice pattern therein, and an RFID tag having a memory storing data and performing RFID communications while a piezoelectric element placed underneath a point of the pad against which a pen is pressed generates voltage among the plurality of piezoelectric elements to thereby supply power to the memory, and the coordinates of the point against which the pen is pressed are stored in the memory; and an external apparatus having an RFID reader performing RFID communications with the RFID tag.

The RFID tag may include a passive RFID tag.

The antenna may transmit data, stored in the memory, to the external apparatus without the use of a power source.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
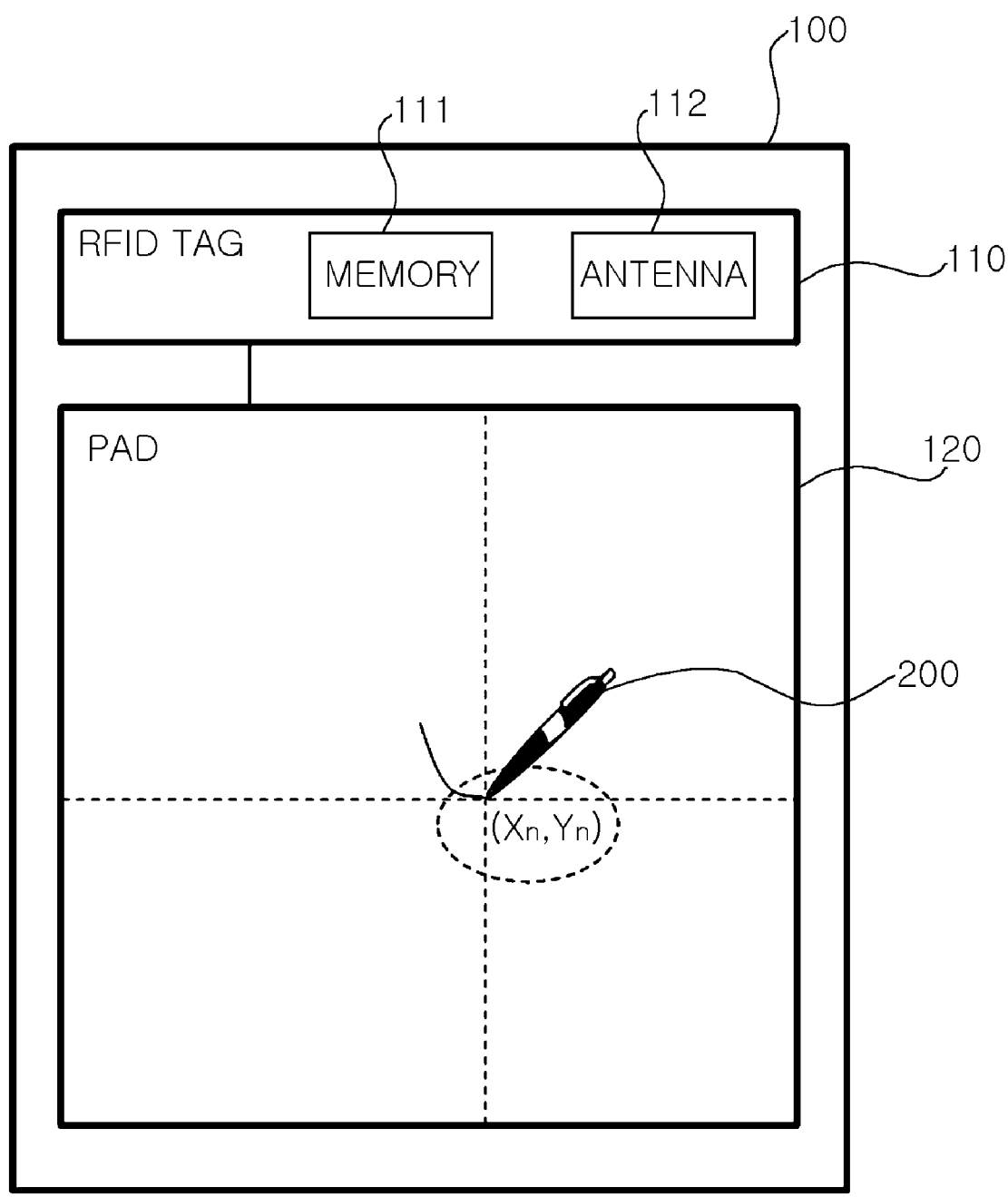
FIG. 1 is a configuration view illustrating a powerless electronic notepad according to an exemplary embodiment of the invention.

Exemplary embodiments of the present invention will now be described in detail with reference to the accompanying drawings. The invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the same reference numerals will be used throughout to designate the same or like components.

It will be understood that when an element is referred to as being "connected with" another element, it can be directly connected with the other element or intervening elements may also be present. In contrast, when an element is referred to as being "directly connected with" another element, there are no intervening elements present. In addition, unless explicitly described to the contrary, the word "comprise" and variations such as "comprises" or "comprising," will be understood to imply the inclusion of stated elements but not the exclusion of any other elements.

FIG. 1 is a configuration view illustrating a powerless electronic notepad according to an exemplary embodiment of the invention.

A powerless electronic notepad 100 according to an exemplary embodiment of the invention includes an RFID tag 110 and a pad 120. The RFID tag 110 includes a memory 111 and an antenna 112.

The pad 120 is an area to which a character or a picture is input with a pen 200. A plurality of piezoelectric elements 121, shown in FIG. 2, is arranged in a lattice pattern within the pad 120.

Figure 2:
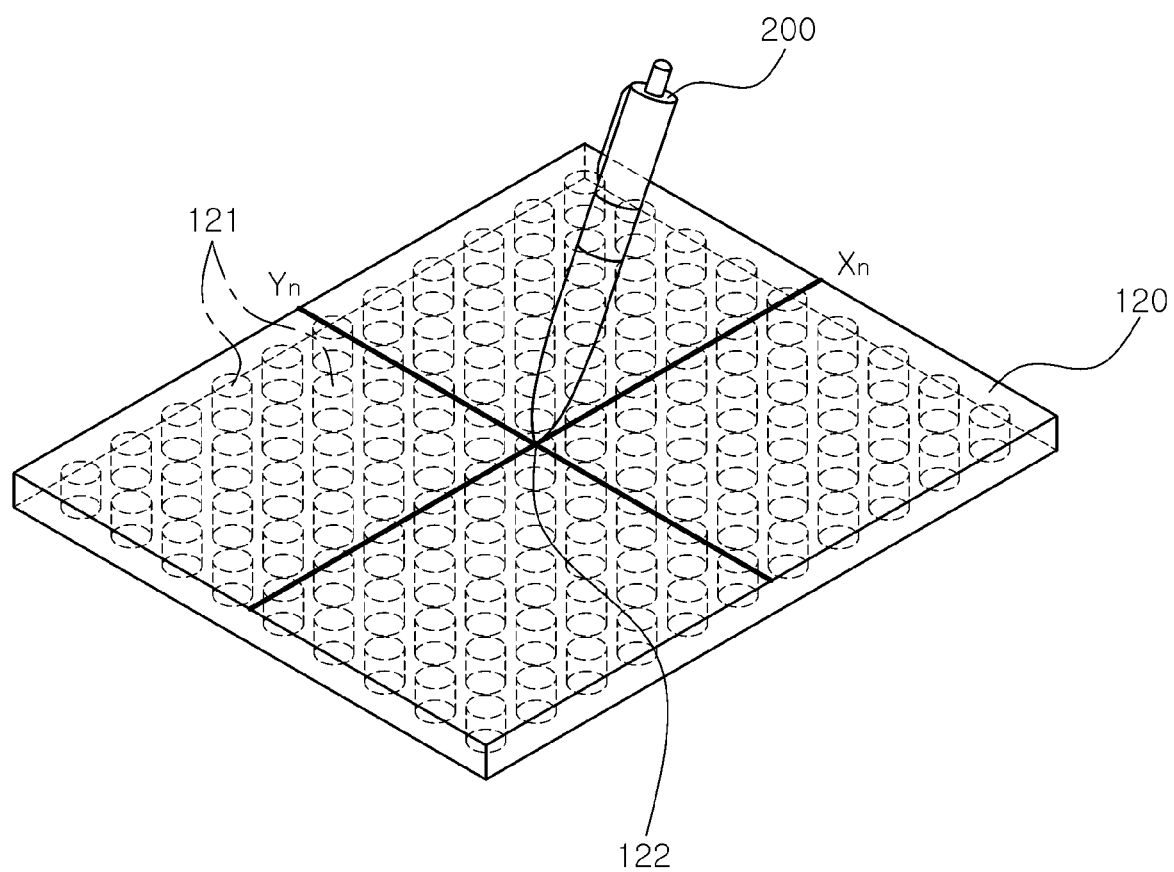
FIG. 2 is a perspective view illustrating the pad of the powerless electronic notepad of FIG. 1.

When paper is placed on the pad 120 and a character is written or a picture is drawn on the paper on the pad 120 using the pen 200, the piezoelectric elements 121, shown in FIG. 2, corresponding to a point against which the pen 200 is pressed generate voltage to supply power to the powerless electronic notepad 100.

The coordinates $(X_n, Y_n)$ of the point against which the pen 200 is pressed are stored in a memory included in the powerless electronic notepad 100. Here, as shown in FIG. 1, this memory may be the memory 111 included in the RFID tag 110. Alternatively, the memory may be a volatile memory (not shown) that is included in the powerless electronic notepad 100.

The RFID tag 110 is implemented as a passive RFID tag that does not require a power source for RFID communications.

Figure 3:
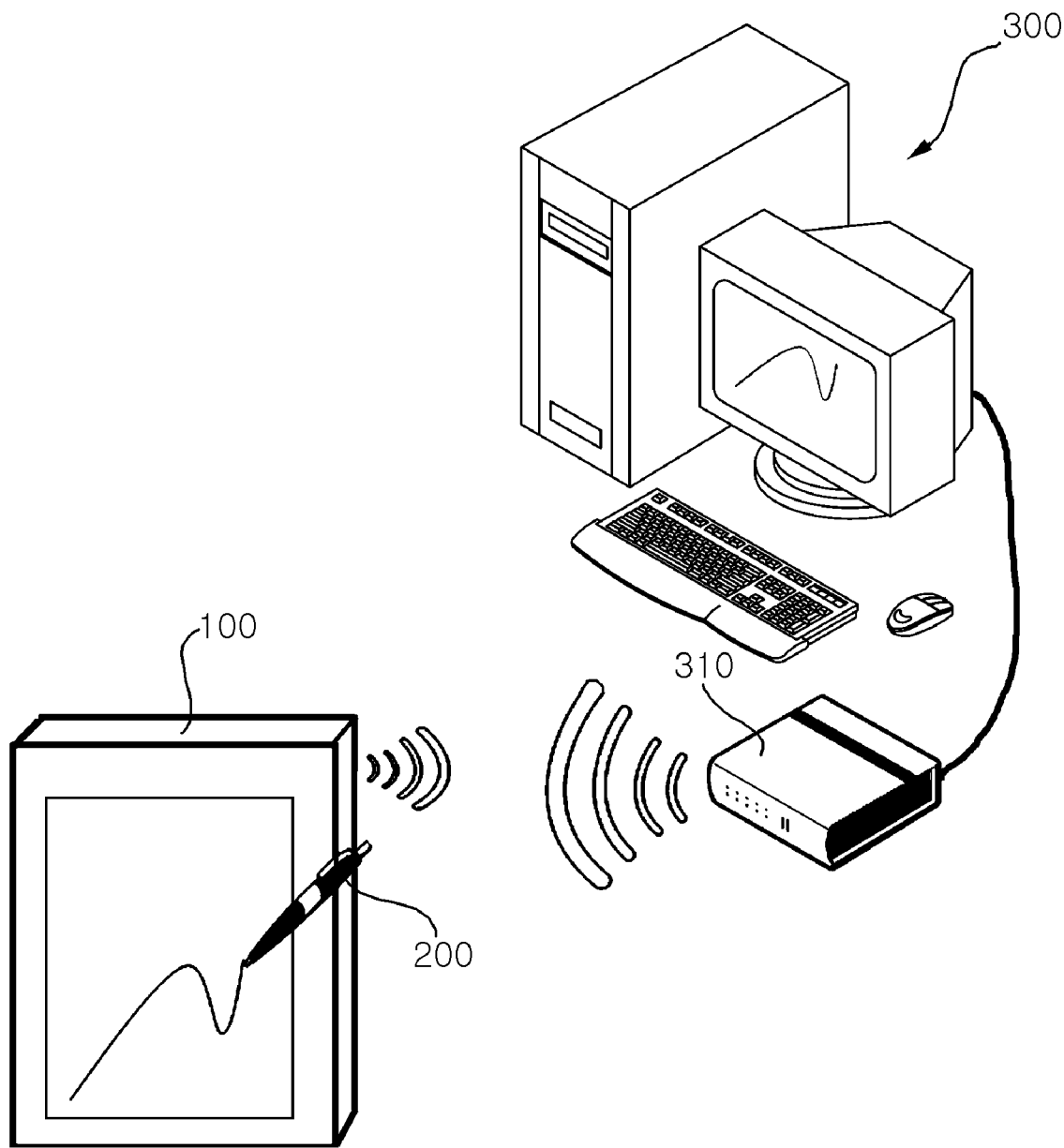
FIG. 3 is a configuration view illustrating a powerless wireless communication system according to another exemplary embodiment of the invention.

When the coordinates ($X_n$, $Y_n$) corresponding to the point of the paper on the pad 120 against which the pen 200 is pressed are stored in the memory 111 included in the RFID tag 110, data stored in the memory 111 may be transmitted to an external apparatus 300, shown in FIG. 3, such as a personal computer (PC) or a laptop computer, which has an RFID reader 310, shown in FIG. 3, attached thereto, through the antenna 112 without the use of a separate power source.

FIG. 2 is a perspective view illustrating the pad of the powerless electronic notepad of FIG. 1. In FIG. 2, the plurality of piezoelectric elements 121, arranged in a lattice pattern are disposed within the pad 120.

When paper is placed on the pad 120 and a character is written or a picture is drawn on the paper on the pad 120 using the pen 200, the piezoelectric elements 121 corresponding to a point 122 with coordinates ($X_n$, $Y_n$) against which the pen 200 is pressed generate voltage to supply power to the powerless electronic notepad 100, shown in FIG. 1. The coordinates ($X_n$, $Y_n$) are stored in the memory included in the powerless electronic notepad 100, shown in FIG. 1.

FIG. 3 is a configuration view illustrating a powerless wireless transmission system according to another exemplary embodiment of the invention.

The powerless wireless transmission system according to this embodiment includes the powerless electronic notepad 100 and the external apparatus 300.

Since the powerless electronic notepad 100 has been described in detail with reference to FIG. 1, a detailed description of the configuration of the powerless electronic notepad 100 will be omitted. However, the powerless electronic notepad 100 that forms the powerless wireless transmission system stores the coordinates corresponding to the point against which the pen 200 is pressed in the memory 111 included in the RFID tag 110, shown in FIG. 1, in order to transmit data without the use of a power source.

The external apparatus 300 includes the RFID reader 310 so as to receive data from the powerless electronic notepad 100. Examples of the external apparatus 300 may include various electric devices, such as personal computers or notebook computers.

In the powerless wireless transmission system, the RFID tag 110, shown in FIG. 1, of the powerless electronic notepad 100 can perform communications with the RFID reader 310 included in the external apparatus 300 without the use of a power source according to an RFID communication protocol.

Therefore, the data stored in the memory 111 of the RFID tag 110, shown in FIG. 1, can be transmitted to the external apparatus 300 without the use of a separate power source.

As set forth above, according to exemplary embodiments of the invention, when a character is written or a picture is drawn on an electronic notepad using a pen, piezoelectric elements corresponding to a point against which the pen is pressed generate voltage to thereby supply power to the electronic notepad, and the coordinates corresponding to the point against which the pen is pressed are stored in a memory, so that data can be stored without the use of a separate power source.

Furthermore, when data is stored in a memory of a passive RFID tag, the passive RFID tag performs communications with an RFID reader connected to an external apparatus according to an RFID communication method, so that the data stored in the memory can be transmitted without the use of a power source.

While the present invention has been shown and described in connection with the exemplary embodiments, it will be apparent to those skilled in the art that modifications and variations can be made without departing from the spirit and scope of the invention as defined by the appended claims.

What is claimed is:

1. A powerless electronic notepad comprising:
a pad including:
a plurality of piezoelectric elements arranged in a lattice pattern, each of the piezoelectric elements corresponding to an X coordinate and a Y coordinate;
an upper surface disposed over the plurality of piezoelectric elements and configured to transmit kinetic energy from a stylus pressed against the upper surface to an underlying piezoelectric element; and
an RFID tag including a memory configured to store X and Y coordinate data and an antenna configured to perform RFID communications,
wherein, when the stylus presses against the top surface, the underlying piezoelectric element generates a voltage which supplies power to the memory, and data corresponding to the X and Y coordinates of the underlying piezoelectric element is transmitted to the RFID tag and stored in the memory.

2. The powerless electronic notepad of claim 1, wherein the RFID tag comprises a passive RFID tag.

3. The powerless electronic notepad of claim 2, wherein the antenna transmits data, stored in the memory, to an external apparatus having an RFID reader therein using power supplied by the plurality of piezoelectric elements.

4. A powerless wireless transmission system comprising:
a pad including:
a plurality of piezoelectric elements arranged in a lattice pattern, each of the piezoelectric elements corresponding to an X coordinate and a Y coordinate;
an upper surface disposed over the plurality of piezoelectric elements and configured to transmit kinetic energy from a stylus pressed against the upper surface to an underlying piezoelectric element;
an RFID tag including a memory configured to store X and Y coordinate data and an antenna configured to perform RFID communications; and
an external apparatus comprising an RFID reader in communication with the RFID tag,
wherein, when the stylus presses against the top surface, the underlying piezoelectric element generates a voltage which supplies power to the memory, and data corresponding to the X and Y coordinates of the underlying piezoelectric element is transmitted to the RFID tag and stored in the memory.

5. The powerless wireless transmission system of claim 4, wherein the RFID tag comprises a passive RFID tag.

6. The powerless wireless transmission system of claim 5, wherein the antenna transmits data, stored in the memory, to the external apparatus using power supplied by the plurality of piezoelectric elements.

* * * * *